United States Patent
Bells et al.

(10) Patent No.: US 7,865,215 B2
(45) Date of Patent: Jan. 4, 2011

(54) MAGNIFICATION OF CURRENTLY SELECTED MENU ITEM

(75) Inventors: Matthew Bells, Waterloo (CA); Andrew Bocking, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1300 days.

(21) Appl. No.: 11/030,122

(22) Filed: Jan. 7, 2005

(65) Prior Publication Data

US 2006/0154696 A1 Jul. 13, 2006

(51) Int. Cl.
*H04M 1/00* (2006.01)
*H04B 1/38* (2006.01)

(52) U.S. Cl. ....................... 455/566; 345/419
(58) Field of Classification Search ............... 455/556.2, 455/566; 715/526, 836; 345/3.1, 5, 205, 345/419
See application file for complete search history.

(56) References Cited

U.S. PATENT DOCUMENTS

| | | | |
|---|---|---|---|
| 5,682,489 A | * | 10/1997 | Harrow et al. ............... 715/839 |
| 5,956,035 A | | 9/1999 | Sciammarella et al. |
| 6,044,385 A | * | 3/2000 | Gross et al. .................. 715/526 |
| 6,359,615 B1 | * | 3/2002 | Singh ........................... 345/173 |
| 7,142,890 B2 | * | 11/2006 | Irimajiri et al. ............. 455/566 |
| 2002/0060749 A1 | | 5/2002 | Funakoshi et al. |
| 2003/0162569 A1 | * | 8/2003 | Arakawa et al. ............ 455/566 |
| 2007/0275762 A1 | * | 11/2007 | Aaltone et al. .............. 455/566 |

FOREIGN PATENT DOCUMENTS

| | | |
|---|---|---|
| JP | 10198546 | 7/1998 |
| JP | 2000314636 | 11/2000 |

* cited by examiner

*Primary Examiner*—Quochien B Vuong
(74) *Attorney, Agent, or Firm*—Ogilvy Renault LLP (57) ABSTRACT

Method and apparatus with a user interface for controlling the apparatus are provided in which a currently selected menu item is magnified in height relative to other items in the menu so as to distinguish the item. While in addition to providing an appealing way to indicate which item is currently selected, the magnification makes the item easier to read, particularly in poorer lighting conditions.

17 Claims, 6 Drawing Sheets

MAGNIFICATION OF CURRENTLY SELECTED MENU ITEM

FIELD OF THE INVENTION

The present invention relates generally to communication devices, and more particularly to a graphical user interface for controlling such devices.

DESCRIPTION OF THE RELATED ART

Designers of user interfaces, particularly a graphical user interface (GUI) for controlling wireless mobile devices are faced with a number of challenges. Wireless devices are usually much smaller relative to less portable computing devices such as laptops and desktop computers. Inherently then, a visual display such as an LCD or other display screen component of the wireless mobile device has a small display area. Text and other objects rendered on the device are dimensioned accordingly which can make visualization difficult.

In addition to being small, the screen component may not be adjustable for brightness and contrast for ambient lighting sensitivities. Often, text or other objects displayed on the screen component can be washed out in certain lighting conditions.

Accordingly, there is a resulting need for a method and apparatus that addresses one or more of these shortcomings.

SUMMARY

The invention relates to a method, graphical user interface and apparatus for controlling an apparatus.

In accordance with a first aspect of the invention, there is provided a method for controlling an apparatus comprising: providing a graphical user interface (GUI) to control operation of the apparatus, said GUI comprising a menu of a plurality of items at least some of which items are selectable by a user to facilitate the control and a one of said items defining a currently selected item; and in response to an input to display the menu, displaying the menu of items such that the height of the currently selected item is magnified thereby to indicate the currently selected item in the menu.

In accordance with a second aspect of the invention, there is provided an apparatus comprising: a storage medium having stored therein a plurality of programming instructions and a processor coupled to the storage medium to execute the programming instructions to enable the apparatus to: provide a graphical user interface (GUI) to control operation of the apparatus, said GUI comprising a menu of a plurality of items a least some of which items are selectable by a user to facilitate the control and a one of said at least some items defining a currently selected item; and in response to an input to display the menu, display the menu of items such that the height of the currently selected item is magnified thereby to indicate the currently selected item in the menu.

These and other aspects will be apparent to persons of ordinary skill in the art including a computer program product such as a machine readable medium storing computer program code executable to perform a method aspect of the invention.

BRIEF DESCRIPTION OF THE DRAWINGS

Embodiments of present invention will now be described by way of example with reference to attached figures, wherein.

DETAILED DESCRIPTION

Figure 1:
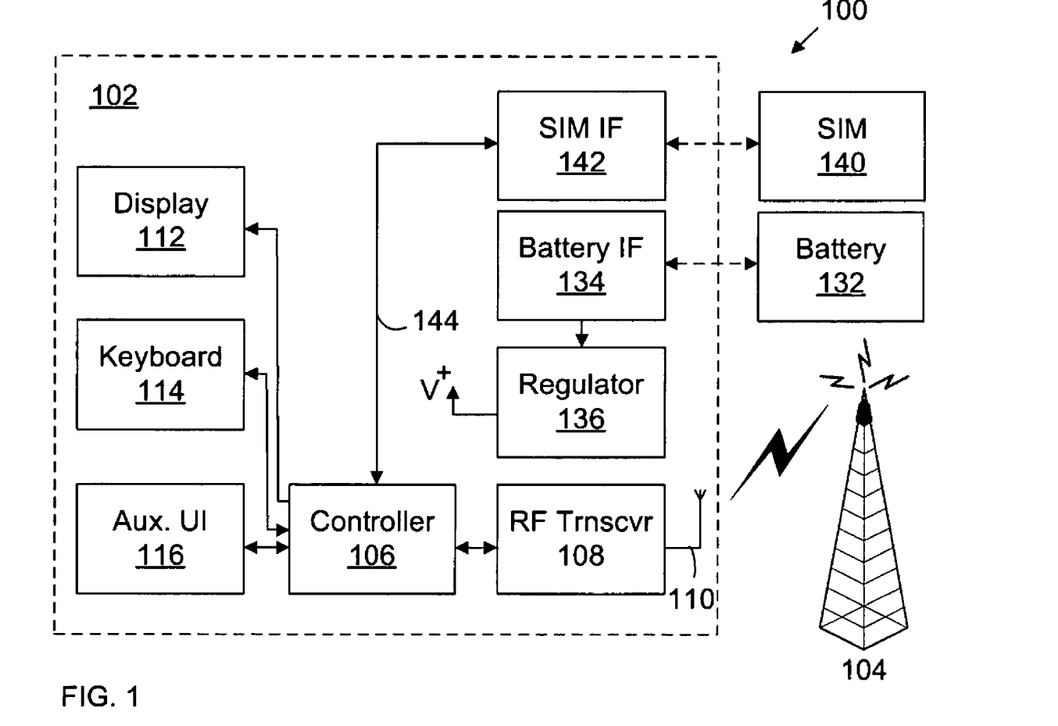
FIG. 1 is a block diagram which illustrates pertinent components of a wireless communication device adaptable in accordance with an embodiment of the invention and which communicates within a wireless communication network.

FIG. 1 is a block diagram of a communication system 100 which includes a mobile station 102 which communicates through a wireless communication network 104 symbolized by a station. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad, full alphanumeric keyboard or full or condensed QWERTY keypad, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from the wireless network 104 over a wireless link via antenna 110. RF transceiver circuitry 108 performs functions similar to those of a base station and a base station controller (BSC) (not shown), including for example modulation/demodulation and possibly encoding/decoding and encryption/decryption. It is also contemplated that RF transceiver circuitry 108 may perform certain functions in addition to those performed by a BSC. It will be apparent to those skilled in art that RF transceiver circuitry 108 will be adapted to particular wireless network or networks in which mobile station 102 is intended to operate.

Mobile station 102 includes a battery interface (IF) 134 for receiving one or more rechargeable batteries 132. Battery 132 provides electrical power to electrical circuitry in mobile station 102, and battery IF 132 provides for a mechanical and electrical connection for battery 132. Battery IF 132 is coupled to a regulator 136 which regulates power to the device. When mobile station 102 is fully operational, an RF transmitter of RF transceiver circuitry 108 is turned on only when it is sending to network, and is otherwise turned off or placed in a low-power mode to conserve power. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface (IF) 142. SIM 140 is one type of a conventional "smart card" used to identify an end user (or subscriber) of mobile station 102 and to personalize the device, among other things. Without SIM 140, the mobile station terminal is not fully operational for communication through the wireless network. By inserting SIM 140 into mobile station 102, an end user can have access to any and all of his/her subscribed services. SIM 140 generally includes a processor and memory for storing information. Since SIM 140 is coupled to SIM IF 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including date book (or calendar) information and recent call information.

Mobile station 102 may consist of a single unit, such as a data communication device, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Figure 2:
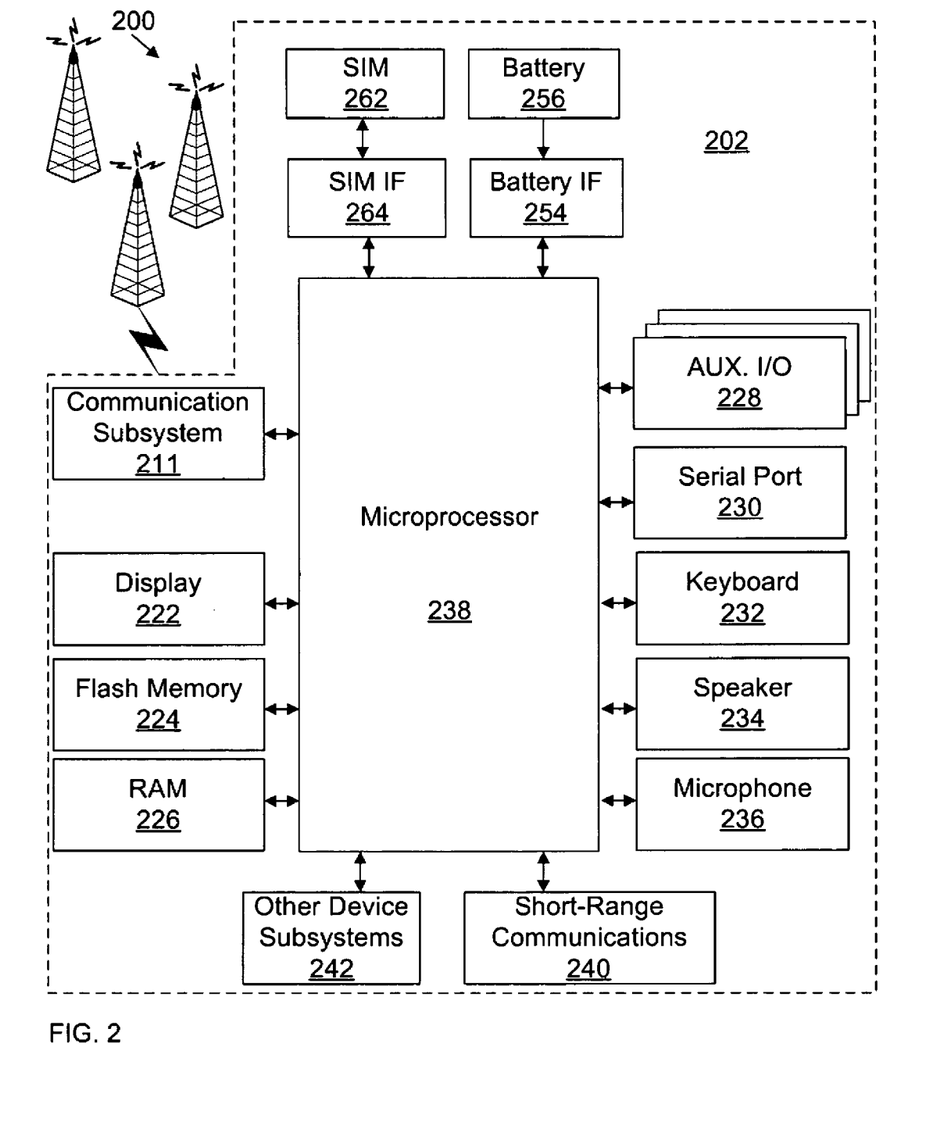
FIG. 2 is a detailed diagram of a preferred wireless communication device of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver, a transmitter, and associated components, such as one or more (preferably embedded or internal) antenna elements and, local oscillators (LOs), and a processing module such as a digital signal processor (DSP) (all not shown). Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Network access is associated with a subscriber or user of mobile station 202 and therefore mobile station 202 requires a Subscriber Identity Module or "SIM" card 262 to be inserted in a SIM IF 264 in order to operate in the network. SIM 262 includes those features described in relation to FIG. 1. Mobile station 202 is a battery-powered device so it also includes a battery IF 254 for receiving one or more rechargeable batteries 256. Such a battery 256 provides electrical power to most if not all electrical circuitry in mobile station 202, and battery IF 254 provides for a mechanical and electrical connection for it. The battery IF 254 is coupled to a regulator (not shown) which provides power V+ to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to the user such as, but not limited to, instant messaging (IM), e-mail, calendar events, voice mails, appointments, and task items. Naturally, one or more memory stores are available on mobile station 202 and SIM 262 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network 200, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222, to auxiliary I/O device 228 or both. A user of mobile station 202 may also compose data items, such as e-mail messages, for example, using keyboard 232 in conjunction with display 222 and possibly auxiliary I/O device 228. Keyboard 232 is preferably a telephone type keypad, full alphanumeric keyboard or full or condensed QWERTY keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment of the invention, mobile station 202 is configured for sending and receiving data items and includes a PIM for organizing and managing data items relating to the user such as, but not limited to, instant messaging (IM), e-mail, calendar events, calendar appointments, and task items, etc. By way of example, mobile station 202 is configured for voice (which may include push to talk over cellular (POC)) and data services, voice mail service, e-mail service, SMS and chat services to which the user subscribes. To provide a user-friendly environment to control the operation of mobile station 202, PIM together with the operation system and various software applications resident on the station 202 provides a GUI having a main screen at one or more sub-screens, menus, dialogs or other GUI display components from which to access and control various services via applications stored on said device or available to it.

Persons of ordinary skill in the art will be familiar with a menu component of a GUI comprising a list of a plurality of items to facilitate controlling the device presenting the menu. In use, a user may select one and, in some implementations and applicable situations, possibly more items for further activity. In one mode, a focus such as a cursor or other visual tool is moved about the menu to select the item. The menu may be rendered on a display screen over an existing display or to replace an existing display.

Figure 3:
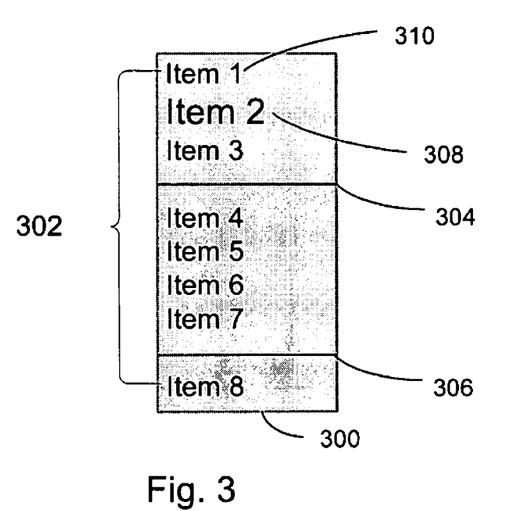
FIGS. 3 to 6 are each an illustration of an example of a menu component of a graphical user interface, in accordance with an embodiment of the invention, for a wireless communication device such as the devices of FIGS. 1 and 2.

Referring now to FIG. 3, there is an example illustration of a menu component 300, in accordance with an embodiment of the invention, for display 222 of mobile station 202 providing a portion of a graphical user interface for controlling mobile station 202. Menu component 300 comprises a list of items 302. Though list 302 comprises eight (8) items, more or less may be used. In the present embodiment, the list 302 has been grouped into three (3) exemplary groups separated by separators 304 and 306 as is known. Each of items 302 is represented by a text description portion (e.g. "Item 1", "Item 2", . . . "Item 8"). Though not shown, menu 300 my also include a graphic image (icon) to denote the particular item or a shortcut key representation (e.g. "Ctrl+U") for invoking the item either directly or through menu 300.

In accordance with the present embodiment of the invention, a currently selected item, namely "Item 2" 308 of items 302 is indicated by magnifying the height of the item 308 relative to the other of items 302. This magnified height distinguishes the selected item 308 from the remaining items 302 which may render the currently selected item more readable on display screen 222.

Figure 4:
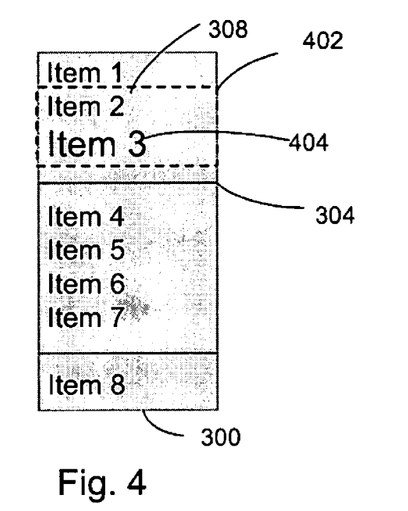

The currently selected item may be selected in the menu of items 300 by a user by moving a focus or cursor (e.g. via a thumbwheel or pointing device) about the menu 300. With reference to FIG. 4, the currently selected item is changed to "Item 3" 404. The height of "Item 3" 404 is magnified relative to the remaining items 302. With reference to FIG. 3, "Item 2", which is unselected by the move to "Item 3" 404, is unmagnified in FIG. 3 to indicate it is no longer the currently selected item.

Box 402 surrounding the unselected item 308 and selected item 404 denotes the a minimal portion of menu 300 that is updated or redisplayed relative to FIG. 3 to display the change. In this way, the height of menu 300 may be fixed and a minimal portion redisplayed to avoid a complete redisplay of menu 300 and at least a portion of any underlying and visible GUI component. Minimizing display changes typically provides a more satisfying user experience, avoiding apparent screen flickering. As well reducing display changes typically results in faster processing on a mobile station 202 or other device where such changes push the limits of the processors for such devices.

Figure 5:
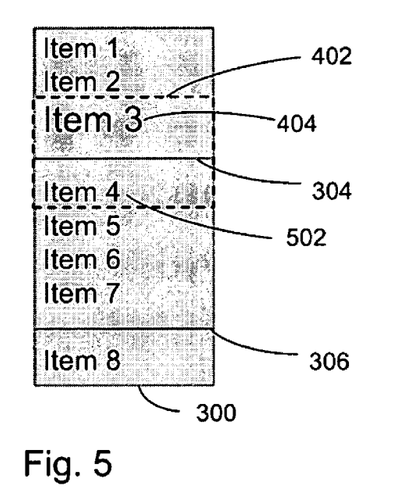
Figure 6:
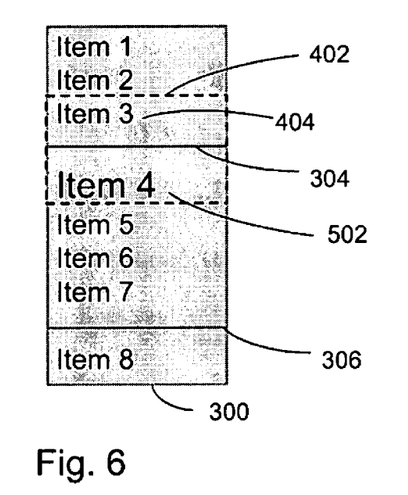

FIG. 5 illustrates menu 300 of FIG. 4 with portion 404 comprising "Item 3" 404, which is the currently selected item, "Item 4" 502, which is about to be selected, and separator 304 disposed between these two items 404, 502. Portion 402 in this view of menu 300 shows the minimal portion of menu 300 to be updated should "Item 4" 502 become the currently selected item. FIG. 6 illustrates this update to menu 300. It is apparent that following the demagnification of the unselected item, the position separator 304 relative to the list of items 302 moves slightly as the currently selected item moves between groups. Thus portion 404 is determined, at least in part, from the height of the currently selected item, the unselected item and any separators between them. Again, a minimal change to menu 300 may be made to update the current selected item without necessarily redisplaying the entire menu 300.

Figure 7:
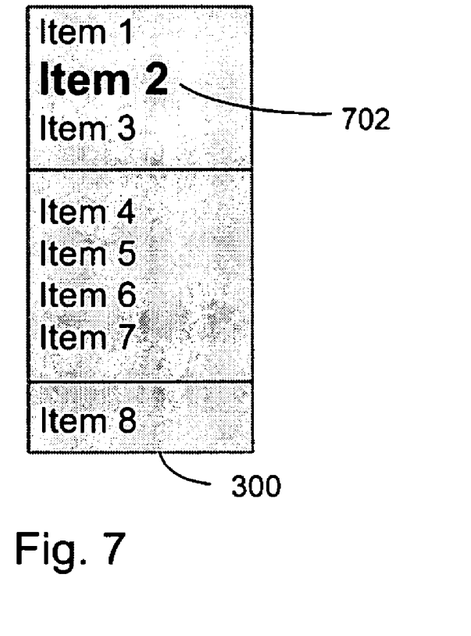
FIGS. 7 and 8 are each an illustration of an example of a menu component of a graphical user interface, in accordance with respective further embodiments of the invention.
Figure 8:
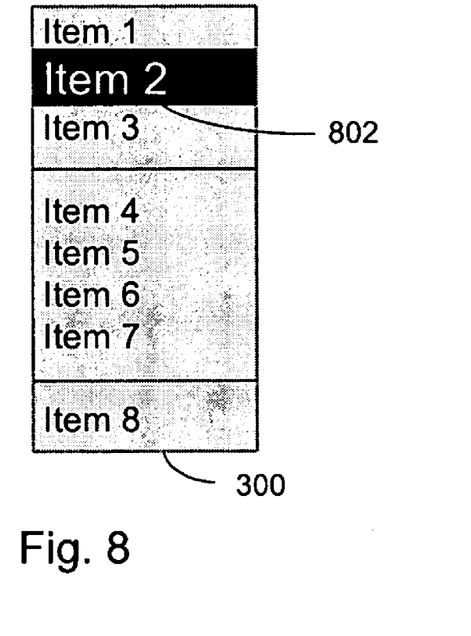

FIGS. 7 and 8 illustrate further embodiments of the invention in which the currently selected item 702 and 802 is denoted by its magnified height as well as other visual features. In FIG. 7, the text portion of the currently selected item 702 is bolded as well as magnified in height. Bolding emphasizes width. In FIG. 8, item 802 is shown in reverse video (i.e. white on black) mode. Other features may be used such as a color change or a boarder around the selected item (not shown).

When magnifying an item, persons of ordinary skill will appreciate that the horizontal size of the item may increase. Thus an initial horizontal size of menu 300 should be determined to accommodate any anticipated horizontal change or the text portion of the item configured accordingly to fit when magnified within the confines of menu 300.

Figure 9:
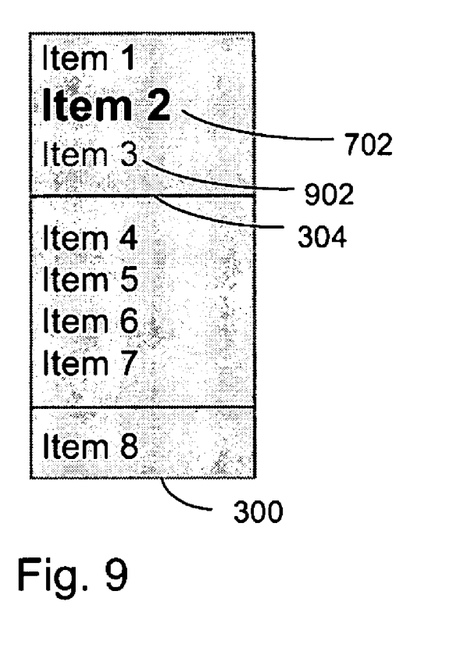
FIGS. 9 and 10 are each an illustration of an example of a menu component of a graphical user interface in accordance with the embodiment of FIG. 7.
Figure 10:
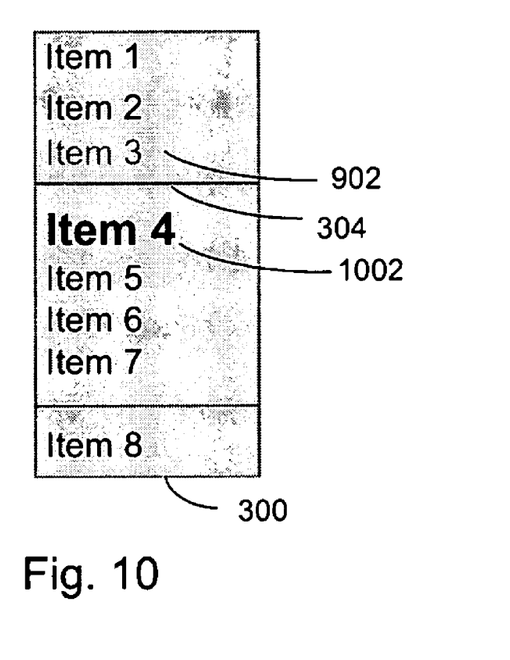

In some views of a menu, some individual items may not be active for selecting. For example, in an editing mode having a menu presenting "copy", "cut" and "paste" items, the "copy" and "cut" items may not be available if an object under edit is not pre-selected before the menu is invoked. FIGS. 9 and 10 illustrate a menu 300 in an embodiment of the invention of FIG. 7 wherein "Item 3" 902 is not available as indicated by a different text shade. In FIG. 9, "Item 2" 702 is the currently selected item. In FIG. 10, "Item 2" is the unselected item and the currently selected item is "Item 4" 1002. Any unavailable item between an unselected item and the currently selected item may be treated like a separator (e.g. 304). The minimal portion to be redisplayed may be determined accordingly.

Figure 11A:
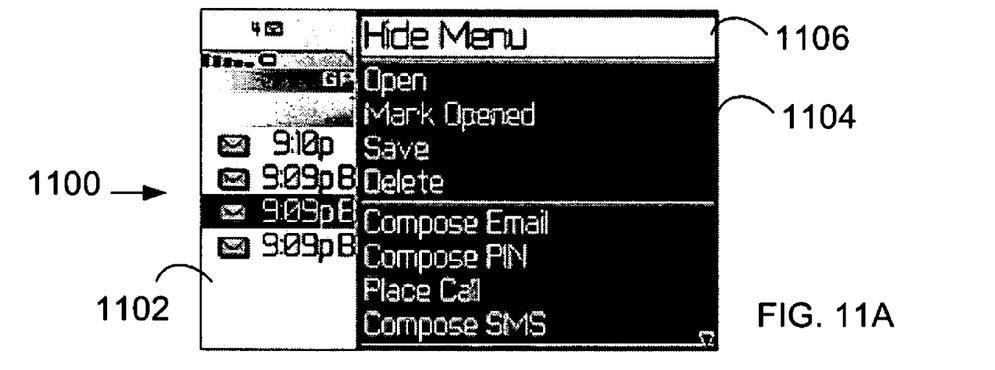
FIGS. 11A, 11B and 11C illustrate a further embodiment of a menu component of a graphical user interface.
Figure 11B:
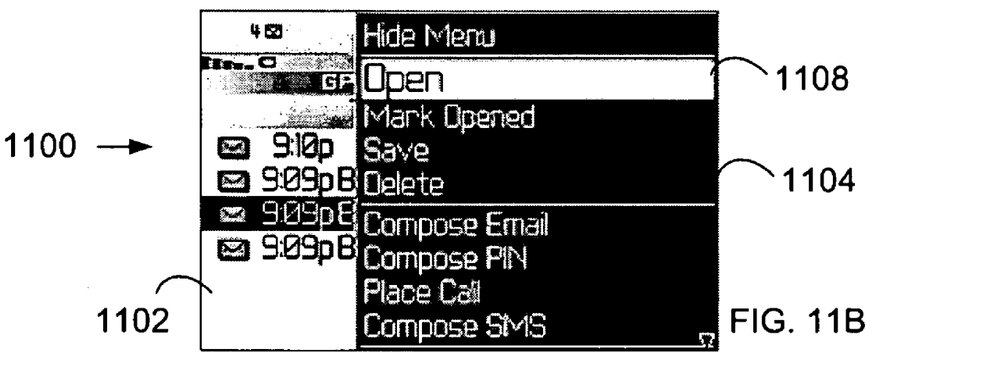
Figure 11C:
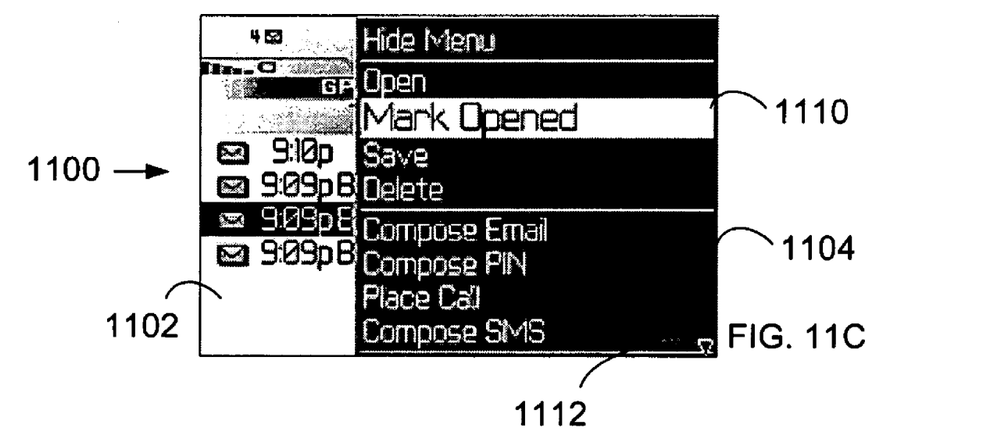

FIGS. 11A, 11B and 11C illustrate a further embodiment of a menu component of a graphical user interface. There is illustrated a screen view 1100 comprising a main screen component 1102 having a menu component 1104 rendered over top. With reference to FIG. 11A, "Hide Menu" 1106 is the currently selected item. Following respect user inputs to move the focus in menu component 1104, "Open" 1108 and then "Mark Open" 1110 are the respective currently selected item in FIGS. 11B and C. In the present embodiment, the currently selected item is magnified in accordance with an aspect of this invention. As well, the focus on the current item is indicated by a reverse video presentation relative to the other menu items. Persons of ordinary skill in the art will appreciate that additional items that may not appear within the menu 1104 due to a size of the display 222 may be viewed using a navigation tool such as is indicated by down arrow 1112.

Figure 12:
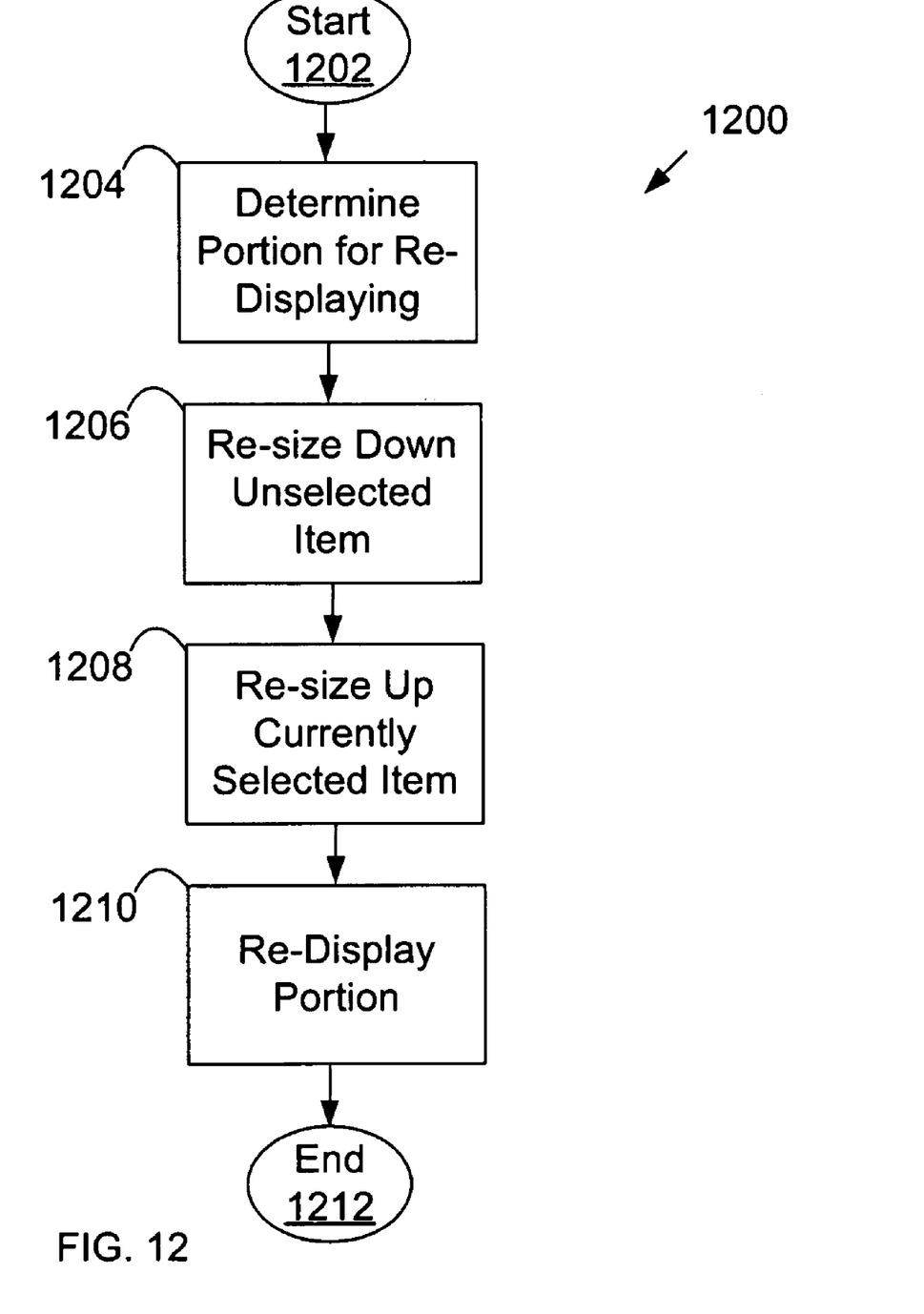
FIG. 12 is a flowchart for operations of a user interface in accordance with an embodiment of the invention.

FIG. 12 illustrates operations 1200 of a menu component of a user interface in accordance with embodiments of the invention. With reference to FIGS. 11A, 11B and 11C, operations 1200 commence at start 1202, typically following a change to a focus in a menu to select a new item. The view of a menu is redisplayed in response to the change. The minimal portion to be redisplayed is determined (step 1204) relative to the unselected item, currently selected item and any intervening separator (including any unavailable items, if applicable). The vertical size or height of the unselected item is re-sized down or unmagnified (step 1206) and the height of the currently selected item is magnified or re-sized up (step 1208). At step 1210, the portion of the menu to be redisplayed is redisplayed and operations end at step 1212. Re-sizing may be accomplished in accordance with a predetermined font size for rendering text portions of an item. A first size may be defined for unselected items of a menu and a second size, typically of the same font type, defined for the currently selected item.

Persons of ordinary skill in the art will appreciate that their may be differences in implementing certain steps of the operations described depending on the configuration of the GUI. For example, the magnification feature may be user configurable via an option of the GUI. The user may select or unselect magnification of the currently selected item and operations 1100 can be invoke in accordance with such a user option. Additional options may also be available to turn bolding reverse video, color or the like on or off or in combination with one another.

While menu 300 is represented as a row-oriented list of times with a single item per row, a column-oriented list may be employed, particularly for column-oriented languages.

Though described with reference to a mobile station device, persons of ordinary skill in the art will appreciate that the user interface and methods herein described may be usefully incorporated into other computing devices which may not be mobile such as personal computers, workstations, telephone handsets and the like.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for controlling a mobile communication device, comprising:
    providing a graphical user interface for controlling the mobile communication device, the graphical user interface comprising a menu of a plurality of items at least some of which items are selectable by a user to facilitate controlling the mobile communication device;
    displaying the menu of items such that at least the height of a selected item is magnified to indicate the currently selected item in the menu;
    receiving a user input for selecting one of the items;
    if the item selected is different from the previously selected item:
        redefining the selected item in response to the user input;
        defining an unselected item as the previously selected item;
    determining a portion of the menu for redisplaying, the portion comprising the unselected item and the currently selected item; and
    re-rendering the portion of the menu such that at least the height of the unselected item is unmagnified and at least the height of the currently selected item is magnified and the magnification of the height of the currently selected item is greater than magnification of a width of the currently selected item.

2. The method of claim 1, wherein the items comprise respective text to be displayed, the method further comprising defining a first font size and a second font size, the second font size being larger than the first font size, wherein the selected item is displayed at the second font size and the other items in the menu are displayed at the first font size.

3. The method of claim 1, further comprising grouping the selectable items into at least two groups, each group comprising one or more of the plurality of items, wherein displaying the menu comprises displaying at least one separator between adjacent groups.

4. The method of claim 3, wherein the portion comprises a separator between the unselected item and the selected item defined in response to the user input and wherein redisplaying the portion comprises redisplaying the separator in response to the resizing of the respective heights of the unselected item and the selected item.

5. The method of claim 1, wherein only the height of the selected item is magnified and the height of the unselected item is unmagnified.

6. The method of claim 1, wherein the portion comprises any intervening items between the unselected item and the selected item and wherein redisplaying comprises redisplaying the intervening items in response to the resizing of the respective heights of the unselected item and the selected item.

7. The method of claim 1, wherein providing the graphical user interface comprises providing an option selectable via the graphical user interface for indicating whether to magnify the height of a selected item of the menu of items and wherein the displaying the menu is responsive to the option.

8. The method of claim 1, wherein the method is applied to a mobile communications device.

9. The method of claim 8 wherein the method is applied to a mobile communications device communicating with a communications system through a wireless communications network.

10. A mobile communication device comprising:
a storage medium having stored thereon a plurality of programming instructions;
a processor coupled to the storage medium to execute the programming instructions;
a graphical user interface for controlling the mobile communication device, the graphical user interface comprising a menu of a plurality of items, at least some of which items are selectable by a user to facilitate control of the mobile communication device;
a display coupled to the processor for displaying the menu of items such that at least the height of a selected item is magnified to indicate the selected item in the menu;
the mobile communication device being further adapted to:
receive a user input for selecting one of the items, such that if the item selected is different from the previously selected item, the selected item is redefined in response to the user input and an unselected item is defined as the previously selected item;
determine a portion of the menu for redisplaying, the portion comprising the unselected item and the currently selected item; and
re-render the portion of the menu such that at least the height of the unselected item is unmagnified and at least the height of the currently selected item is magnified and the magnification of the height of the currently selected item is greater than magnification of a width of the currently selected item.

11. The mobile communication device of claim 10, further adapted to display the items comprising text in a first font size and a second font size, the second font size being larger than the first font size, wherein the selected item is displayed at the second font size and the other items in the menu are displayed at the first font size.

12. The mobile communication device of claim 10, wherein the mobile communication device is further adapted to group the selectable items into at least two groups, each group comprising one or more of the plurality of items, wherein displaying the menu comprises displaying at least one separator between adjacent groups.

13. The mobile communication device of claim 10, wherein the portion comprises a separator between the unselected item and the selected item defined in response to the user input and wherein the programming instructions enable the mobile communication device to redisplay the separator in response to the resizing of the respective heights of the unselected item and the selected item.

14. The mobile communication device of claim 10, wherein only the height of the selected item is magnified and the height of the unselected item is unmagnified.

15. The mobile communication device of claim 10, wherein the portion also comprises any intervening items between the unselected item and the selected item, the mobile communication device being further adapted to redisplay the intervening items in response to the resizing of the respective heights of the unselected item and the selected item.

16. The mobile communication device of claim 10, wherein the mobile communication device provides an option selectable via the graphical user interface for indicating whether to magnify the height of a currently selected item of the menu of items and wherein the display of the menu is responsive to the option.

17. The mobile communication device of claim 10, wherein the processor is adapted to control the graphical user interface and the display, as well as communication between them.

* * * * *